United States Patent [19]
Reece

[11] 3,730,223
[45] May 1, 1973

[54] HIGH PRESSURE FLUID CONTROL VALVE

[76] Inventor: Robert L. Reece, Route 1, Box 130 East, Brentwood, Calif. 94513

[22] Filed: June 1, 1971

[21] Appl. No.: 148,488

[52] U.S. Cl. ............................................. 137/625.23
[51] Int. Cl. ................................................ F16k 11/00
[58] Field of Search .................... 137/625.23, 625.24, 137/625.21, 625.66

[56] References Cited

UNITED STATES PATENTS

| | | | |
|---|---|---|---|
| 2,749,941 | 6/1956 | Gardner | 137/625.23 |
| 3,129,644 | 4/1964 | Andersen | 137/625.23 X |
| 1,546,579 | 7/1925 | Hammond, Jr. | 137/625.23 X |
| 2,182,459 | 12/1939 | Vickers | 137/625.23 |
| 2,234,322 | 3/1941 | Sicard | 137/625.23 |
| 2,728,353 | 12/1955 | Bonham | 137/625.23 |

Primary Examiner—Henry T. Klinksiek
Assistant Examiner—Robert J. Miller
Attorney—Harris Zimmerman

[57] ABSTRACT

A fluid control valve for operating a hydraulic or pneumatic ram or other equipment. The valve is provided with an annular body in which a cylindrical rotor is rotatably mounted. Both the body and rotor are provided with a plurality of ports and passages so as to cause hydraulic fluid to be selectively directed in a plurality of directions.

4 Claims, 7 Drawing Figures

Patented May 1, 1973          3,730,223
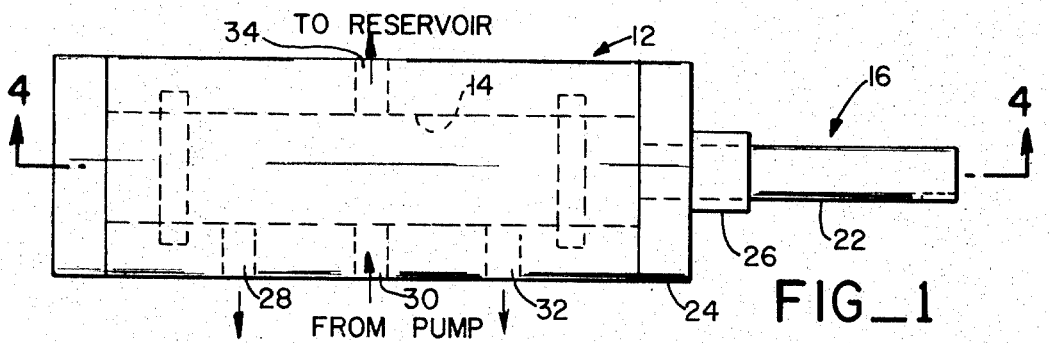
FIG_1
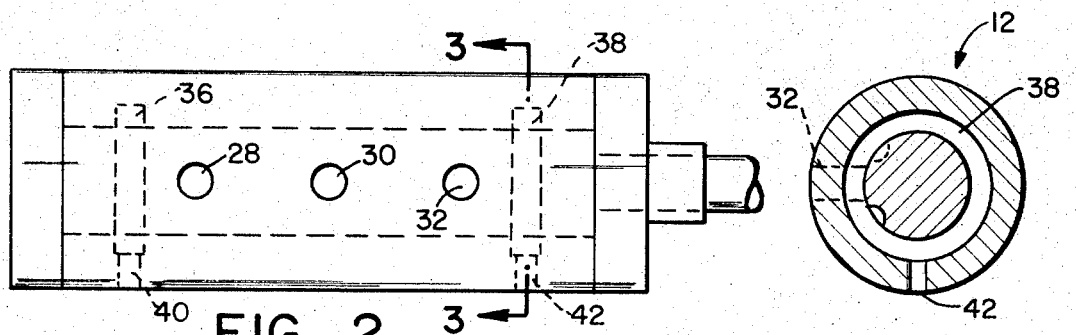
FIG_2     FIG_3
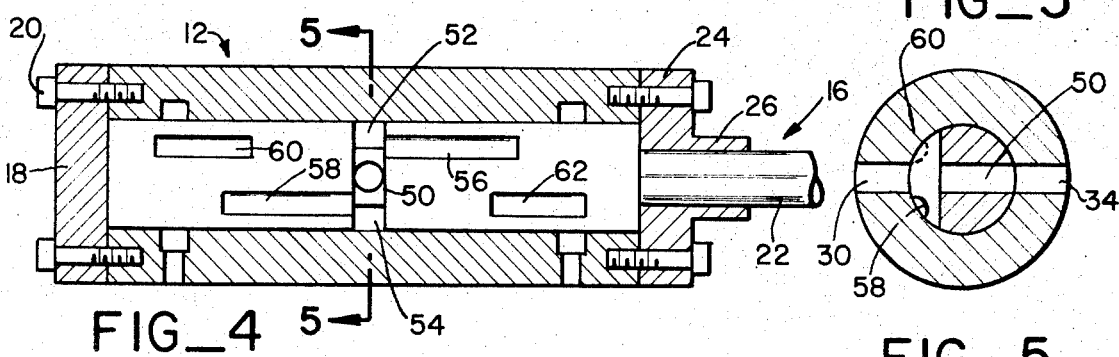
FIG_4     FIG_5
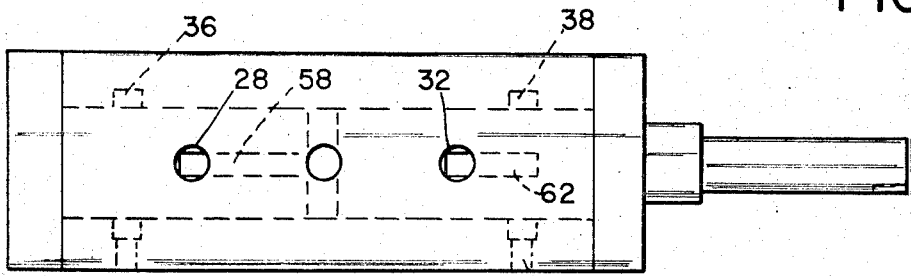
FIG_6
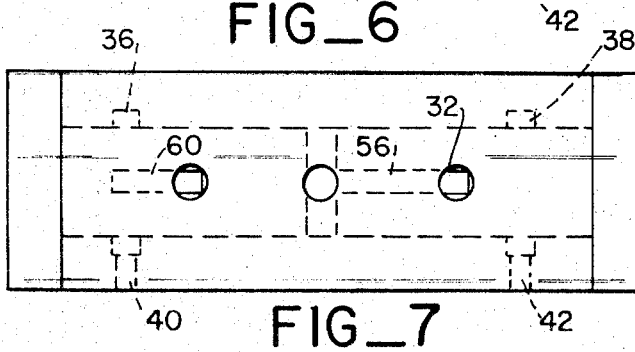
FIG_7
INVENTOR.
ROBERT L. REECE
BY
Harris Zimmerman
ATTORNEY

HIGH PRESSURE FLUID CONTROL VALVE

BACKGROUND OF THE INVENTION

Hydraulic or pneumatic valves of the rotor type are not new in the art. The valve of the present invention has several features of advantage over the prior art devices, including the fact that all of the parts can be produced with simple machining operations, thus substantially reducing the cost of manufacture and resulting in a longer lasting dependable unit, even when continuously operated under high fluid pressures.

A further feature of this invention is that the valve may be connected to a continuously running pump, and in one position of the rotor, merely continuously divert the fluid flow to a reservoir and back to the pump. In another position of the rotor, the fluid may be directed, for example, to one side of a hydraulic ram, while the other side is being bled; and in still another rotor position, a reversal of the latter operation is effected.

THE DRAWING

FIG. 1 is a top plan view of the valve of the present invention;

FIG. 2 is a front elevational view thereof;

FIG. 3 is a cross-sectional view taken on line 3—3 of FIG. 2;

FIG. 4 is a longitudinal sectional view taken in the plane indicated by line 4—4 of FIG. 1;

FIG. 5 is a cross-sectional view taken on line 5—5 of FIG. 4;

FIG. 6 is a view similar to FIG. 2, but with the valve rotor in a different position; and FIG. 7 is another view similar to FIG. 2, with the rotor in still another position of rotation.

DESCRIPTION OF THE PREFERRED EMBODIMENT

In broad terms, the valve of the present invention includes a valve body 12 of generally cylindrical form and having an axial bore or passage 14 extending therethrough. Disposed for rotation in the passage is a cylindrical rotor 16 whose outer surface closely engages the passage walls. One end of the rotor is coterminous with the corresponding end of the body, and such end is closed by an end flange 18 suitably secured to the body by screws 20 or the like. The other end of the rotor is likewise coterminous with its adjacent end of the valve body, but is provided with an axial extension 22 of reduced diameter. Such extension extends beyond a packing flange 24 which closes the end of the body and which has a boss 26 through which the diametrically reduced extension 22 projects. The projecting rod portion or extension 22 provides a means by which the rotor may be rotated within the valve body to effect the above mentioned multi-directional flow patterns.

As best illustrated in FIGS. 1 and 2, the valve body is provided with the following ports and passages which, as will be later described, are adapted for selective flow communication with similar ports and passages of the rotor.

Referring first to FIG. 1, disposed in equal longitudinally spaced and axially aligned relation are three radial ports 28, 30 and 32 extending from passage 14 to exteriorly of the valve body. The center port 30 is adapted to receive fluid under pressure from a suitable pump, the port 28 is adapted to be connected, for example, to one side of a hydraulic ram, and port 32 is adapted to be connected to the other side of such a ram. Neither the pump nor the ram or other apparatus to which the valve is connected is shown in the drawing, since they do not constitute any part of this invention.

In diametric alignment with the center port 30 is a similar port 34, adapted for connection to a reservoir, likewise not illustrated herein.

Positioned axially outwardly from ports 28 and 32 there is provided a pair of passages 36, 38, each such passage constituting a continuous peripheral groove extending radially outwardly from the passage 14. A radial port 40 extends from passage 36 to exteriorly of the valve body, and is adapted for flow communication and connection to the aforesaid reservoir. A similar port 42 extends from passage 38, and is likewise intended for connection to the reservoir. As illustrated, the ports 40 and 42 are longitudinally aligned and offset by ninety degrees to the ports 28, 30 and 32.

Reference is now made to the rotor 16, and it should be noted that centrally of the rotor length, there is provided a diametrically extending port 50, which, in the rotor position illustrated in FIG. 4, is in alignment with the body ports 30 and 34. Thus, fluid from the pump will pass through port 30, through rotor port 50, through port 34 and into the reservoir for mere recirculation of the fluid and with no actuation of a ram or other acted upon apparatus.

Extending in generally parallel relation to the axis of port 50 and disposed on opposite sides thereof, are grooves or passages 52 and 54 which extend from adjacent port 50 to the exterior surface of the rotor whereby when the rotor is rotated from the position shown in FIG. 4, the grooves 52 and 54 may be placed in adjacent flow communication selectively with ports 30 and 34.

A passage 56 in the rotor extends longitudinally from passage 52 in one direction to a sufficient extent to overlie port 32 in one position of rotor rotation. A similar passage 58 extends in the other direction from passage 54 so as to be capable of selective registration with port 28.

Circumferentially offset from passages 56 and 58, there is further provided longitudinally extending passages 60 and 62 in the rotor. Depending on the rotor position, passage 60 can selectively place port 28 in communication with passage 36, while passage 62 can selectively place port 32 in communication with passage 38.

From the foregoing, and as above indicated, when the rotor is positioned as shown in FIGS. 4 and 5, the pump will merely direct fluid through port 30, port 50, and port 34 for recirculation through the reservoir. However, by rotating the rotor, and as shown in FIG. 6, fluid from the pump will still enter port 30, then move through rotor passages 54 and 58, into body passage 36 and out through port 28, thus creating pressure on one side of the ram to which this latter port is connected. In this same position of the rotor, rotor passage 62 will place port 32 in flow communication with passage 38 and port 42, thus permitting the bleeding of fluid from the other side of the ram back to the reservoir.

Conversely, further rotation of the rotor, as shown in FIG. 7, will cause fluid to enter port 30, then move through rotor passages 52 and 56, into body passage 38, and out through port 32, thus creating pressure on the other side of the ram. During this time, the first mentioned side of the ram is being bled, by fluid passing through port 28, rotor passage 60, body passage 36 and to the reservoir through port 40.

Obviously, any desired indicia or operational controls may be placed on the rotor rod extension 22 to determine or indicate its desired appropriate rotational position. It will also be appreciated that the system disclosed herein is equally applicable to pneumatic operation as well as hydraulic, so the term "fluid" as used herein is intended to cover both liquid and air fluids.

I claim:

1. A fluid control valve including a cylindrical body having an axial bore therein, a cylindrical rotor journalled in said bore for rotation therein, said body having a pair of diametrically opposed first ports extending from said bore to exteriorly of the body, one for connection to an external source of fluid pressure and the second for connection to an external fluid reservoir, said rotor having a diametrically extending first port selectively alignable in and out of registration with said opposed first ports for a neutral position recirculation by opening a path of fluid flow from said external source of fluid pressure through one of said first body ports, said diametrically extending first rotor port, and the other of said first body ports to said external fluid reservoir, said body having a second port longitudinally spaced and aligned with one of said body first ports, said body having a peripheral groove longitudinally spaced from said second port in communication with said bore and a third port extending from said groove to exteriorly of the body, said rotor having an external passage on one side of said first rotor port selectively movable into and out of registration with one of said first ports on said body such that when said external passage is in one position in registration with one of said first body ports, said rotor diametrically extending first port is not in registration with the other of said first body ports, and such that when said external passage is in a second position not in registration with one of said first body ports, said rotor diametrically extending first port is in registration with the other of said first body ports, and such that when said external passage is in a third position not in registration with one of said first body ports, said rotor diametrically extending first port is not in registration with the other of said first body ports, said rotor having a longitudinally extending first passage in communication with said external passage and selectively movable into and out of registration with said body second port, and said rotor having a longitudinally extending second passage in communication with said peripheral groove and selectively movable into and out of registration with said body second port.

2. A valve as set forth in claim 1 in which said body is provided with a fourth port longitudinally spaced and aligned with said second port and on the other side of said first body ports, said body having a second peripheral groove longitudinally spaced from said fourth port in communication with said bore and a fifth port extending from said groove to exteriorly of said body, said rotor having a second external passage on the other side of said first rotor port selectively movable into and out of registration with one of said first body parts, said rotor having a third passage extending longitudinally from said second external passage in a direction opposite to said longitudinally extending first passage and selectively movable into and out of communication with said body fourth part, and said rotor having a longitudinally extending fourth passage in communication with said second peripheral groove and selectively movable into and out of registration with said body fourth part.

3. A valve as claimed in claim 2 in which said second port and said fourth port are equally longitudinally spaced from said first body ports.

4. A valve as claimed in claim 1 in which said first and second passages in said rotor are circumferentially offset from each other.

* * * * *